(12) United States Patent
Noonan, III

(10) Patent No.: US 8,051,111 B2
(45) Date of Patent: Nov. 1, 2011

(54) METHOD AND SYSTEM FOR MODULARIZING WINDOWS IMAGING FORMAT

(75) Inventor: Donal Charles Noonan, III, Renton, WA (US)

(73) Assignee: Prowess Consulting, LLC, Seattle, WA (US)

( * ) Notice: Subject to any disclaimer, the term of this patent is extended or adjusted under 35 U.S.C. 154(b) by 422 days.

(21) Appl. No.: 12/023,534

(22) Filed: Jan. 31, 2008

(65) Prior Publication Data

US 2009/0198731 A1 Aug. 6, 2009

(51) Int. Cl.
  *G06F 12/00* (2006.01)
  *G06F 7/00* (2006.01)
  *G06F 17/30* (2006.01)
(52) U.S. Cl. .................... 707/821; 717/169; 717/175
(58) Field of Classification Search .................. 707/640, 707/621, 793, 821
  See application file for complete search history.

(56) References Cited

U.S. PATENT DOCUMENTS

| | | | |
|---|---|---|---|
| 6,108,697 A | 8/2000 | Raymond et al. | |
| 6,122,629 A * | 9/2000 | Walker et al. | 707/613 |
| 6,397,242 B1 * | 5/2002 | Devine et al. | |
| 6,496,847 B1 * | 12/2002 | Bugnion et al. | |
| 6,636,876 B1 * | 10/2003 | Ishihara et al. | 707/640 |
| 6,704,925 B1 * | 3/2004 | Bugnion | |
| 6,711,672 B1 * | 3/2004 | Agesen | |
| 6,725,289 B1 * | 4/2004 | Waldspurger et al. | |
| 6,735,601 B1 * | 5/2004 | Subrahmanyam | |
| 6,782,886 B2 * | 8/2004 | Narayan | |
| 6,789,156 B1 * | 9/2004 | Waldspurger | |
| 6,795,966 B1 * | 9/2004 | Lim et al. | |
| 6,816,963 B1 | 11/2004 | Krithivas et al. | |
| 6,961,941 B1 * | 11/2005 | Nelson et al. | |
| 6,968,350 B2 * | 11/2005 | Traut et al. | |
| 7,017,144 B2 * | 3/2006 | Cohen et al. | 717/100 |
| 7,334,099 B2 * | 2/2008 | Witt et al. | 711/162 |
| 7,584,349 B2 * | 9/2009 | Sedlack | 713/1 |
| 2004/0107199 A1 * | 6/2004 | Dalrymple et al. | 707/100 |
| 2005/0198629 A1 * | 9/2005 | Vishwanath | |
| 2006/0233367 A1 * | 10/2006 | Birrell et al. | 380/210 |
| 2007/0078801 A1 * | 4/2007 | Guruprakash | |
| 2007/0214198 A1 * | 9/2007 | Fontenot et al. | 707/204 |
| 2007/0234302 A1 * | 10/2007 | Suzuki | |
| 2007/0234337 A1 * | 10/2007 | Suzuki | |
| 2008/0092134 A1 * | 4/2008 | Zhang et al. | |
| 2008/0163194 A1 * | 7/2008 | Dias et al. | 717/174 |
| 2008/0244045 A1 * | 10/2008 | Fox et al. | 709/222 |
| 2009/0043890 A1 * | 2/2009 | Noonan, III | |

OTHER PUBLICATIONS

USPTO Communication mailed Feb. 4, 2010 in U.S. Appl. No. 11/836,552; Confirmation No. 3414; 17 pages.

(Continued)

*Primary Examiner* — Kuen Lu
*Assistant Examiner* — Susan F Rayyan
(74) *Attorney, Agent, or Firm* — Hunton & Williams, LLP

(57) ABSTRACT

A method and system may include capturing a computer system in a file-based manner that promotes single-instancing of files and thus prevents the occurrence of duplicate files, separating the captured computer system into primary file resources and ancillary file resources, and creating a parent image and a child image that refers to the parent image. The method and system may further include writing the primary file resources on the parent image, and writing the ancillary file resources onto the child image. The child image may include a resource-only file and a metadata-only file which provides instructions on how to recreate the file resources stored in the parent image and the child image.

28 Claims, 13 Drawing Sheets

OTHER PUBLICATIONS

"Understanding VHD (virtual hard disk) options"—Anil Desai, http://searchservervirtualization.techtarget.com/tip/1,289483,sid94_gci1193492,00.html, Jun. 16, 2006, (6 pages).

Virtual Hard Disk Image Format Specification—http://www.microsoft.com/technet/virtualserver/downloads/vhdspec.mspx, Oct. 10, 2005, (3 pages).

Virtual Hard Disk Image Format Specification—http://www.microsoft.com/interop/osp/default.mspx, Oct. 11, 2006—Version 1.0 (17 pages).

Virtual Disk Format 1.0, VMware Virtual Disks, VMWare Technical Note, www.vmware.com (13 pages).

Virtualization Overview, VMware White Paper, www.vmware.com, 2006 (11 pages).

Virtualization: Architectual Considerations and Other Evaluation Criteria, VMware Whitepaper, www.vmware.com, 2006, (14 pages).

Windows Imaging File Format (WIM)—Mar. 2007 (16 pages).

USPTO Communication mailed Jun. 8, 2009 in U.S. Appl. No. 11/836,552; Confirmation No. 3414; 12 pages.

* cited by examiner

METHOD AND SYSTEM FOR MODULARIZING WINDOWS IMAGING FORMAT

TECHNICAL FIELD OF INVENTION

The present invention relates to the field of disk imaging. In particular, this invention relates to a system and method for creating and deploying a modified imaging format that facilitates portability and updatability of software images.

BACKGROUND INFORMATION

Software images include a large amount of data. For instance, operating systems for personal computers and servers, virtual machines, office suite software, and health care management software take up a great deal of storage space on a computer readable medium. These are just a few examples. Also, multiple images have traditionally been copied onto a single computer-readable media. Often times these multiple images differ in only certain respects. The result is that the majority of the data in those multiple images is common, which results in redundancies across images on the same media.

In response to this problem, methods have been developed to reduce data duplication in imaging by consolidating multiple individual software programs (images) into a single operational, combined image file from which each of the individual programs can be recreated. Such methods are disclosed in U.S. Pat. No. 7,017,144 to Cohen et al. ("Cohen") and the March 2007 document entitled "Windows Imaging File Format" ("Windows Format"), which is cited on an Information Disclosure Statement and attached. Both of these documents are hereby incorporated by reference in their entirety. For example, the Cohen and Windows Format methods may allow for huge operating systems to fit on DVD's. However, there are still problems associated with the conventional imaging format.

The contents of various software packages are frequently updated or supplemented in various manners. For example, operating systems are often updated with various fixes to correct security problems or other software bugs. Another example is that operating systems or virtual machines may be updated with new hardware support or device drivers. With existing image technology, there is no way of imaging these updates rather than to create an entirely new image that includes the updates. As a result a software fix may pose storage and distribution problems if a previously-created image becomes obsolete after a software update. For example, even if multiple versions of the same software have been stored on a single file such that redundant space is eliminated, the single combined file only accounts for the updates that have already been made to the software. The file will become obsolete when the software is updated again, and a new file will need to be created. Thus, the benefits of single-instancing, or reducing data duplication in the creation of a software image, are reduced when a new set of common files is recreated following the receipt of a software update.

There are certain specific limitations of the traditional imaging format methods with respect to software updates.

Monolithic Image File:

Since a standard Windows Imaging Format file ("WIM") is represented as a monolithic file, all images must be appended to this file in order to gain the benefits of single-instancing. When storing only a few images based on the same operating system, it is not uncommon to exceed several gigabytes quickly. Even with today's server and network technologies, replicating large, monolithic files of several gigabytes is not recommended (and sometimes not reliable) in an enterprise environment. Also, caching of these files may not be possible due to their size, so server performance may be impacted when deploying the image to multiple clients.

Existing Spanned Imaging Format:

WIM files can be split into multiple parts of a given size in order to fit on smaller forms of media such as CD/DVD discs. However based on the existing split WIM specification, all parts of the set must be present before an image can be applied. This means split WIM parts that reside on a multiple disk set must be copied to a temporary location before being applied to a computer. For example, on the 5 CD set of Windows Vista Ultimate, each split WIM part is copied to a temporary folder at the root of the system volume before the image is actually applied. This results in longer image deployment times caused by the additional disk i/o copying WIM parts vs. directly applying their contents. This also results in additional free space being required on the target computer, as well as file fragmentation when the WIM parts are removed at setup completion.

Existing Resource-only and Metadata-only WIM:

In the current implementation of resource and metadata-only WIM files, the resource-only WIM (RWM) file stores all file resource data whether common to all images (single-instanced) or unique to one. The resource-only file remains read/write because it must be read during an image apply operation, and be written during a capture. This means that if a resource-only WIM was placed on read-only media, such as CD/DVD disc, no additional images could be captured leveraging that resource-only WIM. Metadata-only WIM files carry only the instructions on how to recreate a single volume image using the resources found in the resource-only WIM. They do not store nor describe what files are unique to a particular image, so replicating or deploying only the differences between one set of images and another is not possible with these formats.

For these reasons, a method and system for modularizing image formats is desired to address one or more of these and other disadvantages. Additionally, a method and system are generally needed to address the lack of flexibility to updates and general lack of portability of software images. The following specification discloses methods and systems for storing, distributing, and updating software images.

SUMMARY OF INVENTION

The Cohen patent and Windows Format disclosure both of which are incorporated by reference herein in their entirety—are drawn to creation of a Windows Imaging Format file which is a single file with multiple volumes. Additionally the disclosures are drawn towards creating a Windows Imaging Format file that utilizes single-instancing; which means not wasting space by storing duplicate files.

The below specification describes modifying the existing Windows imaging format to create the ability to determine the differences between two images and store the differences as a separate child image that refers to the parent image. If a second image (image 2) contains only 100 megabytes worth of difference between a first image (image 1), the ability to shift that difference out onto a difference file and distribute the file separately results in a modular and portable imaging format. Thus, the below specification describes a method and system of manipulating a Windows imaging file such that it is captured and deployed in parent and child pieces. These pieces can be shipped independently, but still be used with the existing Microsoft code.

Exemplary embodiments of the present disclosure may include a method and a system for modularizing a software image.

In an exemplary embodiment, a method may include providing a software image in a parent/child relationship. The parent image may be a computer system that is likely to be updated sometime in the future. As a non-limiting example, the parent image may be the first release of an operating system. Historically, major operating systems have been updated periodically to correct security issues, update drivers, etc. Along with the parent image, a child image may be created and that child image may include a resource-only file and a metadata-only file. Upon first creation, the child image might not include any data. However, when the operating system receives its first update, the updated portion, (i.e. the portion of the updated operating system that differs from the original operating system), may be stored as a child image. The child image may refer to the parent image so that they can be distributed as one and deployed together. To this end, the metadata-only file of the child image may include all the metadata necessary to install an updated version of the operating system using the parent and the child image. In other words, the metadata-only file contains instructions about how the resource-only child image updates the parent image. In this embodiment, the parent image may be a read-only image so that the parent remains constant and all updates are leveraged against that constant parent to create a child image. This particular embodiment is adaptable to more than just an initial update. For example, if the developer of the operating system publishes a second update to the operating system, the newly-updated operating system may be compared against the previously updated operating system embodied in the combination of the parent image and the first child image. The difference between the newly-updated version and the previously updated version may be recreated in a second child image file, which has an accompanying metadata-only file. The method to create the second and all subsequent child images can be performed in several ways including but not limited to: (1) Comparing the newly-updated operating system against the parent image. (2) Comparing the newly-updated operating system against the parent and one or more child images. In method 1, the child image created will contain all of the changes not present in the parent image. In method 2, the child image created will contain only the changes not present in the latest child image included in the comparison. Method 2 may be used to further reduce the network bandwidth and other resource impacts of image updates. For example, a deployment solution could be designed to cache the latest child images on target computers as they become available. Method 2 introduces the concept of "daisy-chaining", a benefit of the new modular imaging format where child images may be linked together during the image capture and apply process in order to reduce the data size and labor required to create and deploy images. The first and second child images may be stored on a server and may be much smaller in size than the parent image. Thus, they may be easier to distribute to an enterprise who may be updating their operating system. That enterprise would not have to recreate the larger parent image, which could be taxing on bandwidth or other resources. Rather, the smaller child images could be downloaded and the operating system could be updated using much less data.

In an exemplary embodiment, the parent image may include data that is common in a plurality of virtual or physical machines. As a non-limiting example, assume that the IT department of a large company would like to create images for every computer in a given department of fifty people with fifty workstations. There are likely to be some similarities between these computers. For instance, they may have the same operating system and the same office applications. However, there may be some differences between these computers as well. For example, some of the computers could have different hardware than others, and so the drivers for that hardware might be different. To make a more modular and portable image, the common data to all the computers may be stored as a parent image. The data that is unique to each computer may be stored as a child image, which is specific to a particular computer, Thus, instead of creating fifty different virtual machines or imaged systems for the fifty computers, a particular embodiment creates a parent image with the data common to all fifty virtual or physical machines, and then creates a child image that is comparatively smaller than the parent image and has data specific to each machine.

Further, creating the image in this parent/child manner results in an image that can withstand updates to the system. As discussed in the above paragraph, the parent image of all the files common to all machines has been created and a child image has been created with the data unique to a specific machine. When a specific machine subsequently receives an update such as an additional piece of software or an updated device driver, its unnecessary to recreate an image of the physical or virtual machine in its entirety. Rather, a second child image may be created which references the first child image which in turn references the parent image. The second child image only contains the differences between the machine as represented by the parent image and the first child image and the currently-updated machine. In this manner, as in the previous example, the second child image is "daisy chained" onto the first child image.

In an exemplary embodiment, the parent image can be spanned, or split into at least two files. Spanning capability may be needed if the parent image is to be distributed on a computer readable disk such as a CD or a DVD and the parent image—even after duplicate files have been removed—is too large to fit onto a disk. In this scenario, the parent image may be split along a predetermined boundary. As an example, if a 2 GB parent image is to be distributed on a CD with a capacity of 700 MB, the parent image may be split along a boundary equal to the capacity of the CD. If the parent image in the monolithic state was called parent.rwm, the image could be split into three parts. The first part could be named parent.rwm, the second part could be named parent2.rwm. Both parent.rwm and parent2.rwm would be 700 MB in size. The third part, parent3.rwm, would be smaller than the first two, only containing the remainder of the original 2 GB.

With this parent/child relationship, distribution and updating of system images is possible in a much more cost effective way. Less data can be moved and images can be updated online. This was not previously possible. Specifically, it wasn't previously feasible due to the nature and the size of the software images.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes computers and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., computers, network elements, etc.) separately. The functions described as being performed at various components may be performed at other components, and the various components may be combined and/or separated. Other modifications also may be made.

Figure 1:
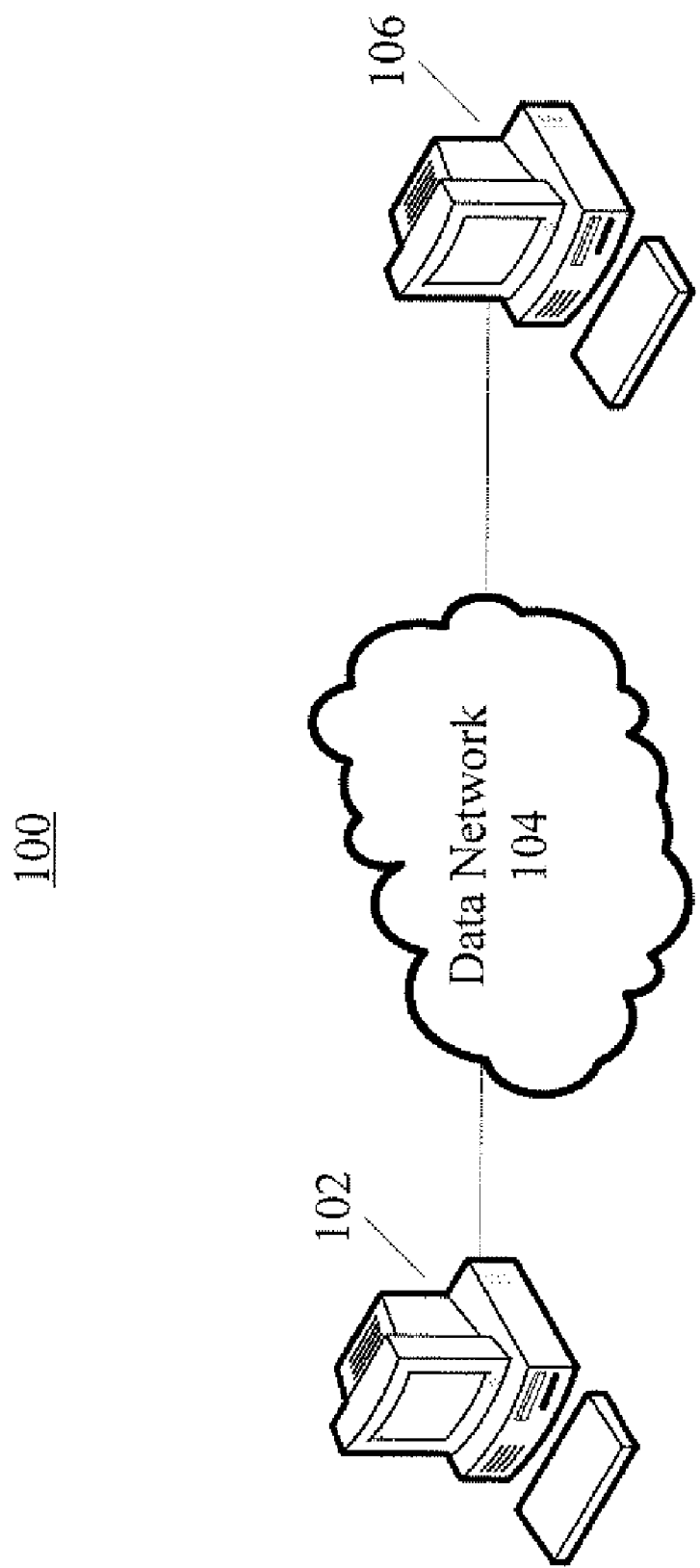
FIG. 1 illustrates a system for modularizing image formats in accordance with exemplary embodiments of the present disclosure.

FIG. 1 illustrates a system for modularizing software images in accordance with exemplary embodiments of the present disclosure. It is noted that system 100 illustrates a simplified view of various components included in the system 100, and that other hardware devices and software not depicted may be included.

In an exemplary embodiment, the system 100 may include a productivity computer 102, a data network 104, and a target computer 106. The productivity computer 102 and the target computer 102 may be computing devices including software, hardware, firmware, and/or combinations thereof capable of running, managing, modifying, or otherwise processing one or more software image. The productivity computer 102 and the target computer 106 may also be a computing system that includes a plurality of computers.

One example of a software image is a virtual machine. A virtual machine may be software that creates a virtualized environment on a computer between the computer hardware and an operating system of the computer. The virtual machine may include virtual machine files that may represent components of the virtual machine. In contrast, a physical machine includes physical components (e.g., physical hard disk, physical Basic Input/Output System (BIOS), chip set, etc.). In traditional VMs, a virtual hard disk of the VM may be stored as a monolithic file or multiple files that may be split up and stored in sectors on a physical hard disk of the productivity computer 102. The physical hard disk of the productivity computer 102 may store the virtual machine files of the virtual hard disk in a sector-based manner as is expected by conventional operating systems. Virtual machines may include redundant virtual machine files.

Software images may also be one or more software programs. For example, a software image of an operating system and office suite software can be created.

The system 100 may permit a computer to create a software image with a parent/child imaging format. The resulting image may include a read-only parent image and at least one resource-only child image. The at least one resource-only child image may be associated with an accompanying metadata file.

The parent image may be stored on a hard disk or on other media such as a compact disk (CD), a digital versatile disk (DVD), or other storage media types. The parent image may also be stored on a server and transported across the data network 104 when the parent image is sent from one computer to another (e.g., from a target computer 106 to the productivity computer 102 via the data network 104).

The data network 104 may be wired, wireless, or combined wired and wireless network that transports data between the productivity computer 102 and the target computer 106. The data network 104 may transport data using known protocols, such as, Internet Protocol (IP), Asynchronous Transfer Mode (ATM) protocol, or other protocol suitable for data transport via packet-switched and/or circuit switched networks. The data network 104 also may include network elements that convert between various protocols. The data network 104 may also include the distributing of parent images on a media disk such as a DVD by way of shipping the media through the mail. It is noted that the system 100 illustrates only a single productivity computer 102, a single network 104, and a single target computer 106. It will be appreciated that multiple instances of these devices may be used.

The following describes creating a modularized software image and modularizing an existing software image locally stored on a hard drive of the productivity computer 102. This process may occur at the productivity computer 102. Alternatively, the productivity computer 102 may instruct one or more other remote computers or servers, such as at the target computer 106, via the data network 104 to create a modularized software image. The productivity computer 102 may include various modules for creating a modularized software image.

The productivity computer 102 may create parent-child relationships between software images. The productivity computer 102 may use parent-child relationships for efficiently deploying new data to and/or updating existing software images. A parent software image may include base virtual machine files for creating a parent image. A child image may include additional functionality for the parent image, may include updates for the parent image, such as, but not limited to, security updates, or may include other data to be added to the parent image. The child image may reference the parent image. For example, a image provider may create a CD containing the parent image, and a user of the parent image may download the child image to update, add to, or otherwise modify the parent image.

When processing the child consolidated image, the productivity computer 102 (or the target computer 106) may deconsolidate the parent image along with the child image to generate an updated image. The productivity computer 102 may first refer to the child image to identify to which image files are pointed by a child pointer table, and may replace the pointed to image files as encountered in the parent image. Also, the productivity computer 102 may deconsolidate the child image and may update the files, etc., of the parent image without again deconsolidating the parent image another time.

Figure 2:
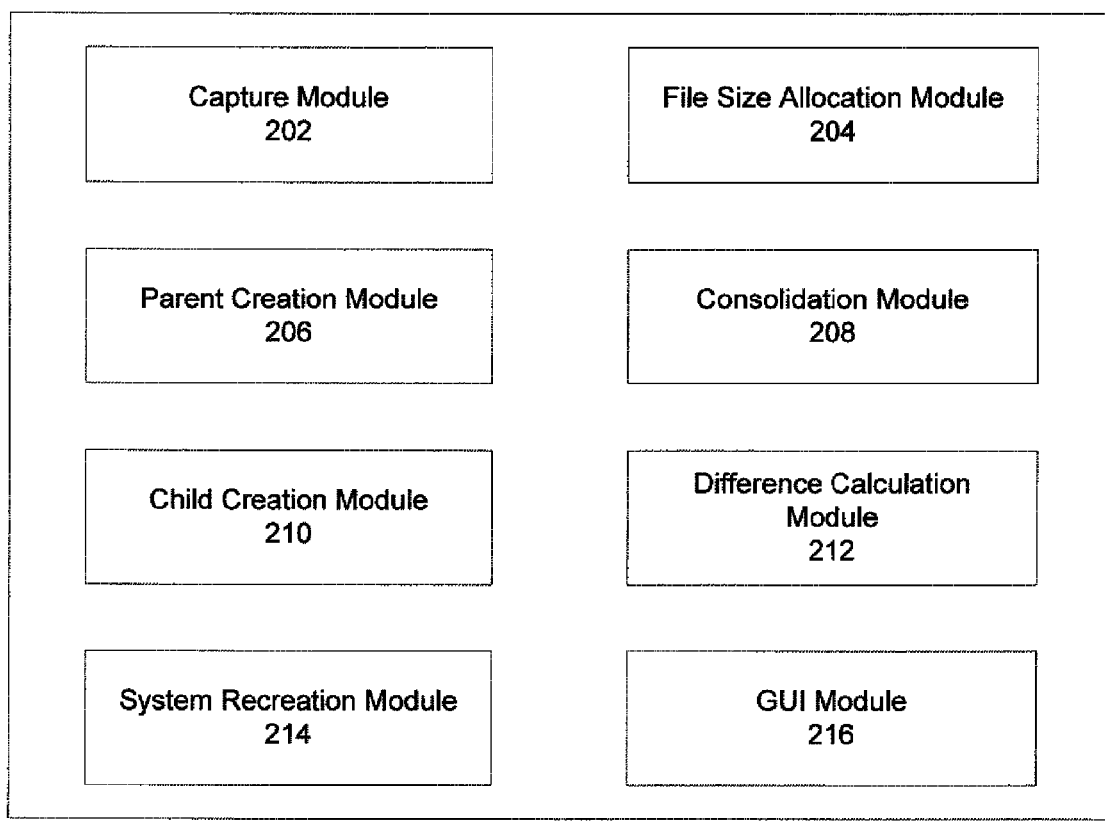
FIG. 2 illustrates an image modularization module implemented at a productivity computer in accordance with exemplary embodiments of the present disclosure.

FIG. 2 illustrates an image modularization module 200 implemented at a productivity computer in accordance with exemplary embodiments of the present disclosure. The image modularization module 200 may include a capture module 202, a file size allocation module 204, a parent creation module 206, a consolidation module 208, a child creation module 210, a difference calculation module 212, an image reproduction module 214, and a graphical user interface (GUI) module 216. It is noted that modules 200, 202, 204, 206, 208, 210, 212, 214, and 216 are exemplary and the functions performed by one or more of the modules may be combined with that performed by other modules. The functions described herein as being performed by the modules 200, 202, 204, 206, 208, 210, 212, 214, and 216 also may be separated and may be performed by other modules remote or local to the productivity computer 102.

The capture module 202 may capture a virtual machine or software for a physical machine such as an operating system and/or a collection of software. The capture module 202 may be communicatively coupled with several other modules depicted in FIG. 2. For example, when capturing a virtual machine, the capture module may operate alongside the consolidation module to ensure that the captured image is single-instanced and does not include duplicate files. Methods and systems for ensuring that a captured image is single-instanced are described in the Cohen patent and the Windows Format disclosure, both of which are herein incorporated by reference in their entirety. The capture module 202 may also communicate with the file size allocation module to determine whether the captured parent and/or child image can fit onto the media that will be used to distribute the image. For example, if the parent image is to be distributed on a CD or DVD disk, the file size would be limited to the size of that disk. If the parent image is greater in size than the CD or DVD disk, then the parent image may be spanned over several disks. An example of a spanned parent image will be further described with respect to FIG. 5.

The file size allocation module 204 may determine file size limitations based on the media with which the parent and child images are to be distributed. The file size allocation module may be communicatively coupled with at least the capture module 202, the parent creation module 206, and the child creation module 210. The file size allocation module 204 may be used in a determination of whether a parent image or child image should be spanned across different media. In a particular embodiment, the file size allocation module 204 may also be communicatively coupled with a GUI module 216. In this scenario, the capacity of the media with which the parent and child image are to be distributed on may be input by a user using the GUI module 206.

The parent creation module 206 may create the parent image. The creation of the parent image may take into account the capacity of the media with which the image is to be distributed. This information may be received from the file size allocation module 204 working in conjunction with the GUI module 216 and may determine whether the parent and/or child images should be spanned over multiple media. The parent creation module may also be communicatively coupled with the capture module 202 and may refer to a system, a collection of software, or a combination of a collection of software and a system that is to be captured. The parent creation module may determine what system files and software applications should be included in the parent image versus which of these should be stored and distributed as child image. The parent creation module may store the parent image on a read-only disk.

The consolidation module 208 may create a consolidated image that is single-instanced and does not include duplicate files. The consolidation module may prevent the duplication of files and may therefore conserve memory space in both the physical and virtual machine context. Some of the functions of the consolidation module 208 are described in the Cohen patent and/or Windows Format disclosure both of which are incorporated by reference in their entirety.

The child creation module 210 may create the child image. The child image may include files that are unique to a given computer. In an exemplary embodiment, the child image may include files that update a system or a collection of software. The child image may be created as an empty file that will be later updated with data when a system or collection of software on a parent image is updated. The child image may also be created and immediately filled with data that is not considered to be common to a computer system—i.e., that is specific to a given machine. The child creation module 210 may be communicatively coupled with other modules described with respect to FIG. 2.

The difference calculation module 212 may be used to determine the files that are to be included in a child image when the parent image has been updated in some fashion. For instance, if the parent image is Windows XP™ plus Office 2003™, a child image may be created that is initially empty, but that will later include updates to the operating system and/or office software. When updates are received, the difference calculation module 212 may compare the original operating system and office software against the operating system and office software as updated. The difference calculation module 212 may calculate the difference between current and previous versions. The results of the difference calculation performed by the difference calculation module 212 may be used by the child creation module 210.

The image reproduction module 214 may take the created parent image and child image as inputs and may recreate the system or collection of software embodied on the parent and child image onto the target computer or computer system 106. The image reproduction module 214 may be communicatively coupled with the GUI module 216, and in this manner may recreate on the target system the parent and child images referred to by a user.

The GUI module 216 may present various graphical user interfaces to the user at the productivity computer 102 and/or the target computer 106. The graphical user interface may allow a user to select one or more computer systems and/or collections of software for image creation in a parent/child structure. The computer systems may represent physical machines or virtual machines.

Figure 3:
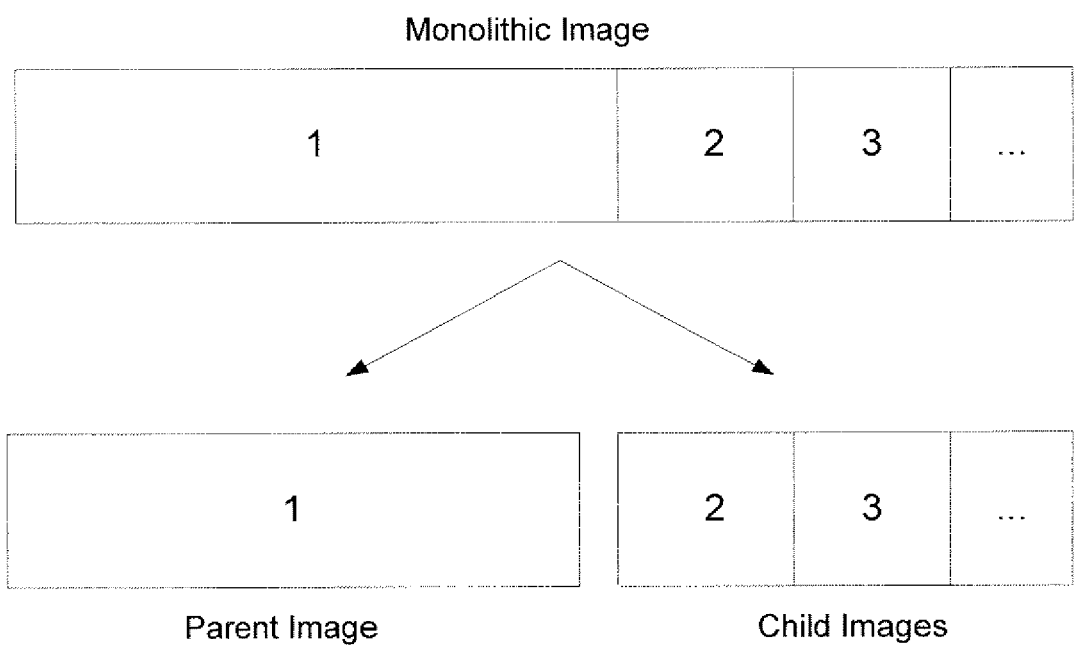
FIG. 3 illustrates how a parent image and one or more child images depart from a monolithic file, which is the structure of the traditional Windows Imaging Format file.

FIG. 3 illustrates how a parent image and one or more child images depart from a monolithic file, which is the structure of the traditional Windows Imaging Format file. The parent/child structure as an imaging format is a modification to the monolithic image file. With the parent/child structure, the parent image may be kept read-only after it is created, and then after an update to the imaged software, the newly-updated software may be leveraged against the read-only parent file to create one or more child files.

In the monolithic state, an update to the software or one or more computer systems embodied in the monolithic file may result in a total recreation of the entire file. With the frequency of updates to both hardware and software in computer systems, re-replicating and reburning the image every time may become inefficient in a non-trivial manner.

It should be noted that the parent/child relationship in software imaging may be utilized in the context of both virtual and physical machines. In the virtual machine context, the monolithic image depicted in FIG. 3 may include several different virtual machines (1, 2, 3, etc.). Virtual machine 1 of the monolithic image may be a consolidated virtual machine that includes files common to several machines. Virtual machines 2 and 3 may include data that is specific to an individual virtual machine. This idea of consolidation is also represented in the parent and child images, but is taken to the next level and made more portable as a result of the parent/child relationship. In this manner, several virtual machines that all refer to the same parent image can be distributed in a more efficient manner. The parent image may be burned onto a DVD, for example, and the child images may be hosted on a web server of some kind that may be accessible remotely. By separating the parent image from the child image, the entire system of machines may be recreated by reference to the single parent image and then the smaller child image—which may be specific to each individual machine—may be downloaded off a server.

Figure 4:
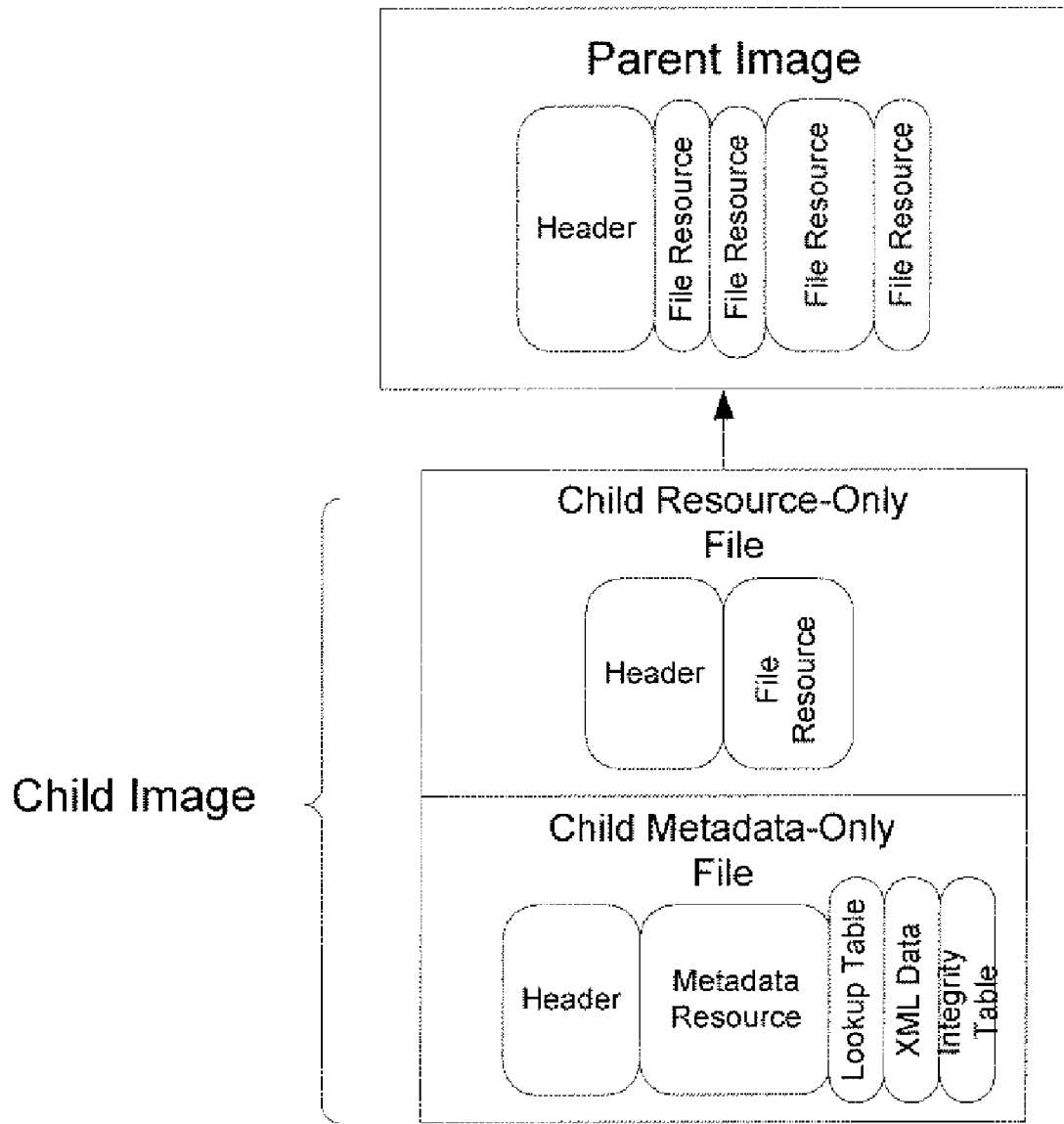
FIG. 4 illustrates an arrangement of the parent image and child image in accordance with exemplary embodiments of the present disclosure.

FIG. 4 illustrates an arrangement of the parent image and child image in accordance with exemplary embodiments of the present disclosure. The file configuration may be structured in a hierarchy of three files. The parent image may contain file resources. The child image may contain two files: A resource-only file that contains unique file resources or contains updates to software embodied in a parent image. The child metadata-only file may contain metadata which provides instructions for how to put the resource files of the child image and of the parent image back together when the files are restored.

In the context of a virtual machine, the parent file is a single file that may contain multiple volume images.

The parent/child WIM format may be a modification to existing WIM formats. Like a split (spanned) WIM, it may be created from a monolithic WIM file. A computer program may be used to convert an existing WIM file containing two or more images into a parent/child relationship. The resulting file set has the following advantages over the existing WIM formats:

Read Only Parent: Parent resource-only files can be marked as read-only or copied to read-only media such as CD/DVD discs, yet can still be leveraged by images captured at a later time. For example, an initial master may be distributed via DVD disc and can still be used to deploy future image content.

Relatively Small Child: Child resource-only files may contain unique file resources that do not already exist in the master, so images captured at a later time are relatively small. For example, an initial parent and child pair could be placed on a network share and when updates to an image are required, only the delta or difference would need to be replicated (megabytes rather than gigabytes).

Spanning Capability: Both master and delta files can be split (spanned) into smaller parts, yet images can be applied directly from the parts without all being present simultaneously. This eliminates the longer deployment times and additional free space requirements associated with traditional split WIM files.

In addition to a computer program written to convert from a traditional monolithic WIM file to a parent/child relationship, another program may be used to apply all variations of the parent/child format directly to popular virtual hard disk formats. It has the following additional advantages over existing WIM imaging APIs:

Images can be directly written to popular virtual hard disk formats via a user-mode executable.

The program is a service-less and driver-less application, so images can be applied without administrative or elevated permissions.

Split (spanned) versions of the Parent/Child format can be applied directly from media.

For purposes of explanation only, the relationship between the parent and the child may be illustrated with an example. It should be appreciated, of course, that this example is non-limiting and is provided for purposes of illustration only. If a large company wants to deploy Windows Vista™ plus Office 2007™, they create a company-wide image—a golden image—to deploy to 150,000 workstations. The first time around they stamp the DVD of the image and ship the DVD to all of their offices for installation on office workstations. At each office location, the image may be hosted on a local server and then deployed to the workstations.

Microsoft may subsequently come out with updates. At first, each client can download the update separately, but at some point the updates become so large that the company wants to go back and re-image another golden image to include the updates. With the previous imaging technology, the company would melt the original 5 gb image, inject the critical updates, re-burn all of the media, and then ship it out again in the manner described above.

In an exemplary embodiment, an alternative to the previous imaging technology is to start out creating the first golden image as a parent image, and split it into a parent/child structure right away. At first, the parent image might be 5 gb, and the child image would be very small. The child image may include a child resource-only file that would contain no bytes because there have not been any deltas or differences yet. The child image would also include a child metadata-only file which would explain the pathing and would provide all the metadata associated with putting the Vista and Office 2003 image down on a person's device. Three months later when the 90 critical updates come in and the original image is stored in this parent/child relationship, an exemplary solution is to add the 90 critical updates to a machine and compare that machine to a reference machine that just contains the original golden image version of Vista plus Office 2003 without the critical updates. So, the image is captured against the original parent image and the only information that is output in this comparison process is the delta or difference between the two. This delta is stored as the first child image. The name of the child image could be, for example, "November $1^{st}$ Update."

Now that this update has been produced, only the child image needs to be replicated to get the updated version of the software out to the 150,000 workstations. The original 5 gb image—which may be stored on a server or may have been distributed via DVD disk—is left alone. The 90 critical updates are published as a child image file, which is likely to be substantially smaller than the parent image (e.g., 40 mb). The parent/child structure allows for the parent image to still be leveraged, but the child image is applied concurrently with the parent image and in this manner the November $1^{st}$ version of Office and Vista can be deployed to 150,000 workstations without re-replicating the 5 gb parent image.

At this point, the November $1^{st}$ update has been replicated on the network and we also have the original golden image of Vista plus Office 2003 that has been sitting on the server or distributed via DVD disk or other computer readable media, still in existence.

Figure 5:
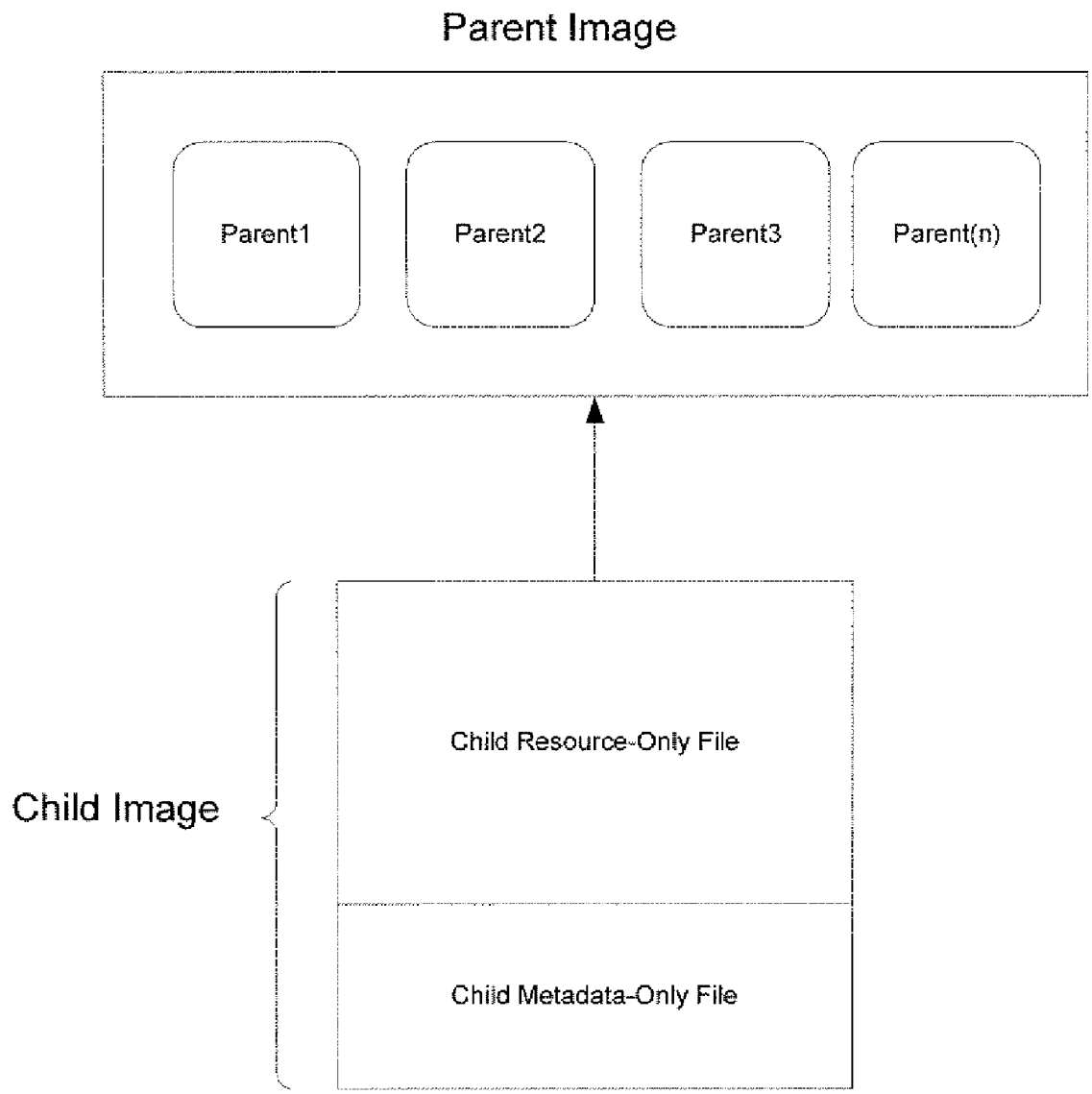
FIG. 5 illustrates spanning capabilities of the parent/child file format in accordance with exemplary embodiments of the present disclosure.

FIG. 5 illustrates spanning capabilities of the parent/child file format in accordance with exemplary embodiments of the present disclosure. It is noted that FIG. 5 illustrates spanning only of the parent image and not of the child image. It is also noted that there is only one child image depicted in the Figure. It should be appreciated that this arrangement is merely exemplary and that both the parent image and the one or more child resource-only files may be spanned. Further, it should be appreciated that there may be more than one child image.

It may be necessary to span the parent image if the parent image is larger than a predetermined capacity. The predetermined capacity may be based on the capacity of a disk (e.g. CD, DVD) that the parent image is to be distributed on. In an exemplary embodiment, the parent image can be spanned, or split into at least two files.

In this scenario, the parent image may be split along a predetermined boundary. As an example, if a 2 GB parent image is to be distributed on a CD with a capacity of 700 MB, the parent image may be split along a boundary equal to the capacity of the CD. If the parent image—in the monolithic state—was called parent.rwm, the image could be split into three parts. The first part could be named parent1.rwm, the second part could be named parent2.rwm. Both parent1.rwm and parent2.rwm would be 700 MB in size. The third part, parent3.rwm, would be smaller than the first two, only containing the remainder of the original 2 GB. Traditionally, the header of resource-only WIM files do not contain a part number since they were not originally designed to span. An exemplary embodiment of this present disclosure provides a modified version which adds the necessary header information including the part number to allow compatibility with existing WIM tools.

After the original parent image is spanned into three parts, the parent image may be distributed on CD's.

In a particular embodiment, the child image may be spanned in a similar manner as the parent image. It should be noted, however, that only the resource-only file of the child image is spanned. When the resource-only child file is spanned, the metadata-only file remains singular, but is still able to refer to the spanned child resource-only file.

Figure 6:
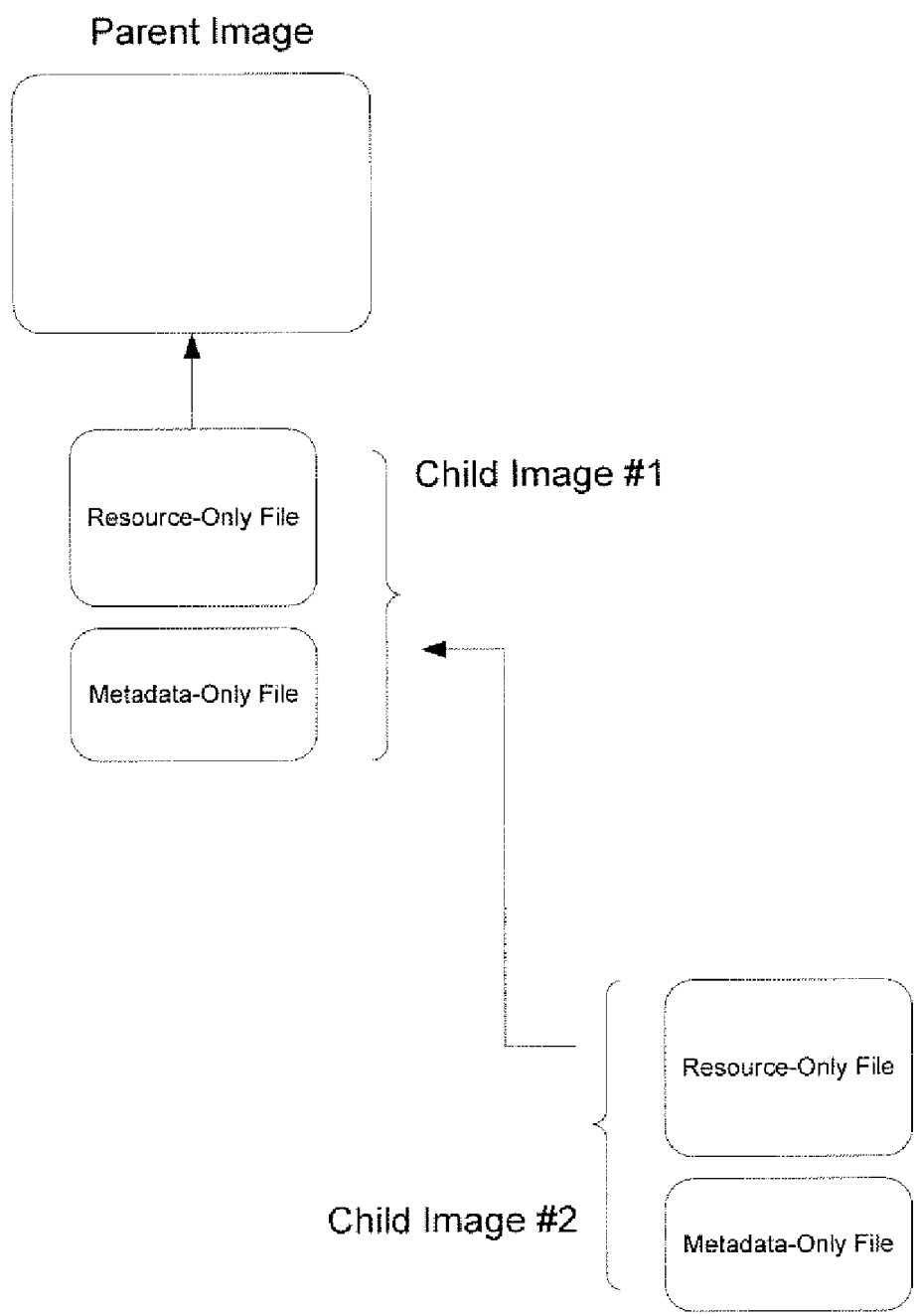
FIG. 6 illustrates the daisy-chaining capabilities of the parent child file format in accordance with exemplary embodiments of the present disclosure.

FIG. 6 illustrates the daisy-chaining capabilities of the parent/child file format in accordance with exemplary embodiments of the present disclosure. In a particular embodiment, additional updates to a parent image may be stored as additional child images which only contain the differences between the system as it appeared after the previous batch of updates and the system as it appears after the most recent batch of updates. The child image that stores the additional update may be daisy-chained onto a previous child image. FIG. 6 illustrates only a single daisy-chained child image, but it should be appreciated that multiple child images may be daisy-chained in a similar manner.

The concept of daisy-chaining child images onto a parent image may become clearer by way of an example. In the previous example, where there was a November $1^{st}$ update, assume that two more months pass and there are 30 more updates, and so it may be necessary to create a new delta file, which could be entitled, for instance, "January $1^{st}$ update." In creating the January $1^{st}$ update child image, it is possible in an exemplary embodiment to leverage the November $1^{st}$ child image and assume that the November $1^{st}$ update exists. If the November $1^{st}$ update was 40 mb, and the January $1^{st}$ update is 10 mb, it is possible to keep the November $1^{st}$ update on the network and then create an additional child image—the November $1^{st}$ update—which is only 10 mb.

After this additional update, there are four files. The original parent image still exists and still has not been touched. Also, there is the November $1^{st}$ child image, which includes a resource-only file and a metadata-only file. And the January $1^{st}$ child image also includes a resource-only and a metadata-only file.

In an exemplary embodiment the child resource-only files are smart enough to allow additional child images to be daisy-chained off one another. This may be accomplished by logically ANDing a new value to the existing WIM flags member to indicate whether or not a previous sibling is required for image restoration. The metadata-only files may have metadata that can refer to a previous child and know what resources are stored in that previous child. The child image, in other words, does not look exclusively to the parent image to see what files are being used. If there is a file, e.g., "Don.txt", that exists only in the November $1^{st}$ update and not in the parent image, it is not necessary to put "Don.txt" in the January $1^{st}$ update if the November $1^{st}$ update is still available.

A daisy-chained child image may be created by comparing an image that represents the combined system of the parent, the existing child, and a subsequent update against an image that represents the previous version represented by the parent image and the first child image. The difference between these two combined systems may be then stored as an additional child.

As is described previously in the specification, the parent image may be a read-only image so that the parent remains constant and all updates are leveraged against that constant parent to create a child image. In the daisy-chaining context, new updates may be leveraged against a parent image and a first child image to create a second child image. In this manner, the first child image may be made read-only such that it remains constant and the additional updates are leveraged against a constant parent image and a constant first child image.

Figure 7:
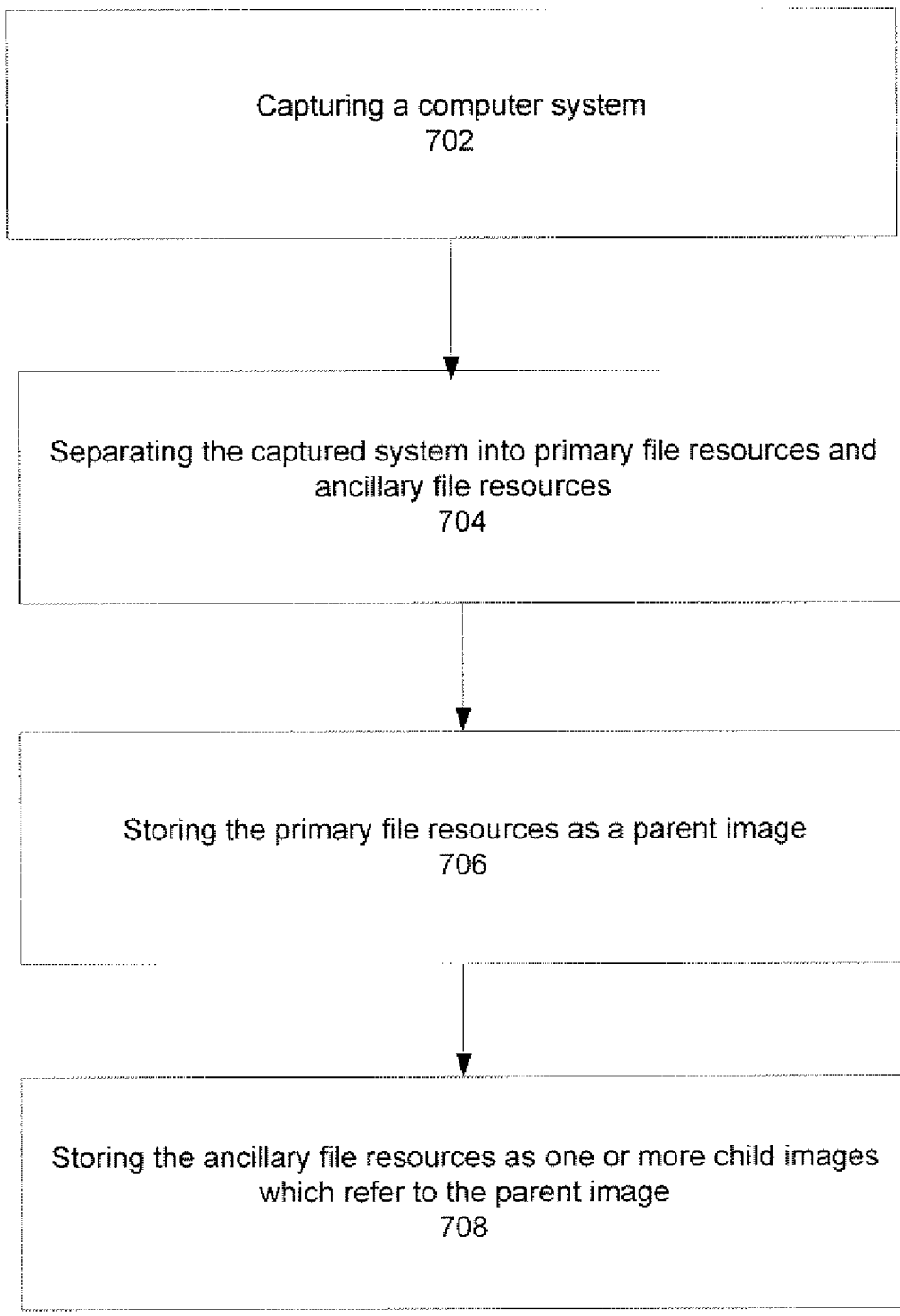
FIG. 7 is a flowchart illustrating a general overview of the process of creating parent/child images in accordance with exemplary embodiments.

FIG. 7 is a flowchart illustrating a general overview of the process of creating parent/child images in accordance with exemplary embodiments. In block 702, capture module 202 may capture a computer system. In a particular embodiment, the computer system may be one or more virtual machines. In another embodiment, the computer system may be the collection of software that makes up a physical machine. The capture module 202 may work in conjunction with the consolidation module 208 and may capture the computer system in a manner that provides for the single instancing of files. In other words, the capture module 202 and consolidation module 208 determine files that are duplicate files and eliminate these redundancies in the capture process. Methods and processes for promoting the single-instancing of files are described in the Cohen patent and Windows Format disclosure, both of which are incorporated by reference in their entirety.

In a particular embodiment, the result of the capture of the computer system by capture module 202 is a collection of file resources. In block 704, the parent creation module 206 and child creation module 210 may work in conjunction with the GUI module 216 and separate the captured system into primary file resources and ancillary file resources. In block 706, the parent creation module 206 may store the primary file resources as a parent image. In block 708, the child creation module 210 may store the ancillary file resources as one or more child images which refer to the parent image. Both the parent creation module 206 and the child creation module 210 may work in conjunction with the file size allocation module 204 to determine whether it may be necessary to span or split the parent or child images.

The separating of file resources into primary and ancillary file resources may be based on different criteria. In a particular embodiment the file resources that are common to multiple machines in a computer system may be deemed to be primary file resources. The unique file resources may then be deemed to be ancillary. In a computer system comprising multiple machines, each machine may have its own unique set of file resources that differ from the common file resources. A child image may therefore be created which corresponds to each individual machine.

In another embodiment, the file resources may be divided into primary or ancillary file resources based on predetermined parameters. Such predetermined parameters may be pre-existing in the image modularization module 200 or they may input from the GUI module 216. To provide some non-limiting examples, a computer system that includes an operating system and office software may be split so that the operating system file resources are primary and are thus stored in the parent image. It follows that the office software file resources would be ancillary file resources and would be stored as a child image which referred to the parent image. Another example is that of application software running off a database management system. The file resources of the database management system may be defined as primary file resources and thus stored as the primary image. The file resources of the application software may then be defined ancillary file resources and stored as child images. This scenario may be beneficial, for example, in the context of software demo. A software distributor may allow a consumer to demo certain types of application software. If this application software runs off a common operating system or database management system, then the operating system or database management system may be stored as a parent file and produced only once for several different applications. To then demo different applications, the consumer can download the individual applications—which may be of smaller size than the operating system or database management system—and not have to download the larger file multiple times.

In another embodiment, all of the single-instanced file resources in an initial capture of a computer system may be deemed to be primary file resources. The child image in this scenario may have a resource-only file without any data in it. Initially storing the computer system as a parent image may allow for future updates to the computer system to be stored as a child image. In this manner, the parent image does not have to be re-replicated upon the receipt of several updates to a computer system.

Figure 8:
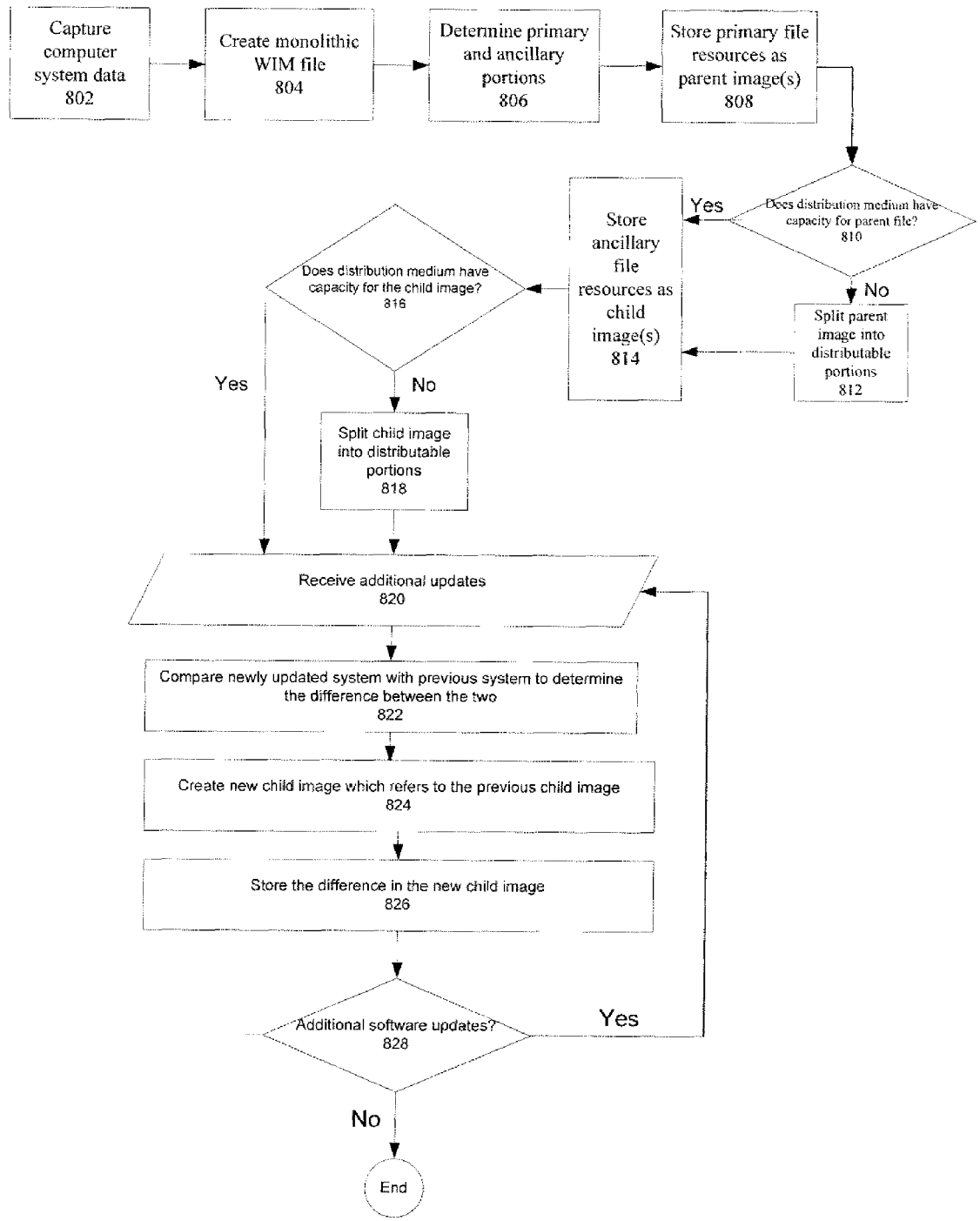
FIG. 8 is a flowchart that illustrates the creation of a child image by comparing an updated computer system against the previous computer system and adding additional child images when further updates are received in accordance with exemplary embodiments.

FIG. 8 is a flowchart that illustrates the creation of a child image by comparing an updated computer system against the previous computer system and producing just the difference between the two as a child image. FIG. 8 also illustrates spanning both the parent and the child images and daisy-chaining an additional child image onto a previous child image. It should be appreciated that the flowchart in FIG. 8 is purely exemplary and non-limiting. In some instances the steps shown in the flowchart may be performed in a different order or possibly omitted. Also, many of the steps may be presented in a simplified manner and may encapsulate other sub-steps.

In blocks 802 and 804 capture module 202 may capture a computer system and create a monolithic WIM file. In a particular embodiment, the computer system may be one or more virtual machines. In another embodiment, the computer system may be a collection of software that makes up a physical machine. The capture module 202 may work in conjunction with the consolidation module 208 and may capture the computer system in a manner that provides for the single-instancing of files. In other words, the capture module 202 and consolidation module 208 determine files that are duplicate files and eliminate these redundancies in the capture process. Methods and processes for capturing a computer system in a monolithic form in a manner that promotes the single-instancing of files are described in the Cohen patent and Windows Format disclosure, both of which are incorporated by reference in their entirety.

In block 806, processes are performed on the captured file resources to determine which file resources are primary and which are ancillary. The primary/ancillary determination may be based on files that are common to a computer system and files that are unique. The common file resources may be considered primary file resources and the unique file resources may be considered ancillary file resources. The primary/ancillary determination may be arbitrary and/or it may be based upon predetermined rules. As a non-limiting example a server management system could be predefined to represent the common files, and software applications running off the server could be the ancillary files. As another non-limiting example, the primary file resources may be all the file resources of a current system, and the ancillary file resources may be the system updates that may be later received.

In block 808, the parent creation module 206 may store primary file resources as a parent image, or if the primary file resources exceed a predetermined capacity, as a set of spanned images. The parent image may be a resource-only image and may include a WIM header file and file resource data. The file may be made read-only so that it may be stored on a read-only medium. The image modularization module 200 may create the parent image, the child image resource-only file, and a metadata-only file prior to storing primary file resources in the parent image.

In blocks 810 and 812, the file size allocation module 204 may determine the maximum capacity of the distribution medium that the parent image is to be stored on. If the parent image is larger than the maximum capacity, the file size allocation module 204 may split or span the parent image into two or more files that are lesser than or equal to the capacity of the distribution medium. The image may be split along a boundary that may be defined by user input or system default. A user input may be facilitated by the GUI module 216. The parent creation module 206 may perform a process where remaining space may be checked prior to the writing of each file resource. A new child file may be created if there is not sufficient remaining space. As is illustrated in FIG. 6, a new child file may include a metadata-only file that includes information about how to re-assemble a parent image and at least one child images.

In block 814, the child creation module may store the ancillary resource as a child image which refers to the parent image. Like the parent image, the file size allocation module may determine—as is illustrated in blocks 816 and 818—whether the child image should be spanned or split into different parts. In some embodiments, the system may be defined such that all the file resources are initially considered primary. In this embodiment, the child image may contain zero megabytes as no file resources have yet been stored. The child image may later be filled in with file resources that may come from a system update.

It should be appreciated that the processes performed in blocks 808-812 do not necessarily have to occur prior to the steps from blocks 814-818. For example, the storing of file resources into a parent and child image may be part of a single process that creates parent resource-only files, child resource-only files, and metadata-only files simultaneously.

Blocks 820-826 illustrate steps for daisy-chaining additional child images onto an existing child image. A graphical depiction of daisy-chained images is provided in FIG. 6. For convenience of illustration, block 820 is shown as operating as if a child image already exists. As was stated above, however, there are some instances where the child image may be empty upon creation. In such an embodiment, the child creation module 210 may store the updates received in block 820 as a first child image which refers to the parent image.

In block 820, a computer system may receive additional updates. In block 822 the updated system may be compared against the system that existed prior to the update. This comparison produces differences between the prior and updated systems. The differences may be stored in the resource-only file of the child image. In an exemplary embodiment the consolidation module 208 consolidates the original image and the received updates into a single combined image. The difference calculation module 212 may then compare the consolidated image against the parent image to determine the differences between the two.

In an alternative embodiment, the image modularization module 200 may create an additional child image without capturing the updated system and then comparing the updated system with a previously updated system. In such an embodiment, the image modularization module 200 may scan a source computer system prior to capture and then compare the scan to the existing parent/children to determine what flies will actually be captured. The child creation module 210 may then write child directly.

In blocks 824 and 826, child creation module 210 may create a child image which may refer to a parent image or may refer to a parent image and one or more previously created child images. The child creation module 210 may create a metadata-only file for each newly created child image. It should be appreciated that the child image of blocks 824 and 826 may be spanned or split in a similar manner to the parent image and previous child image. As discussed above with respect to blocks 808-818, the file size allocation module 204 may compare the size of the child image to be created with the capacity of the distribution medium where the new child image will be stored. If the child image exceeds the capacity, the child image may be spanned or split into at least two parts that are less than or equal to the available storage capacity.

Figure 9:
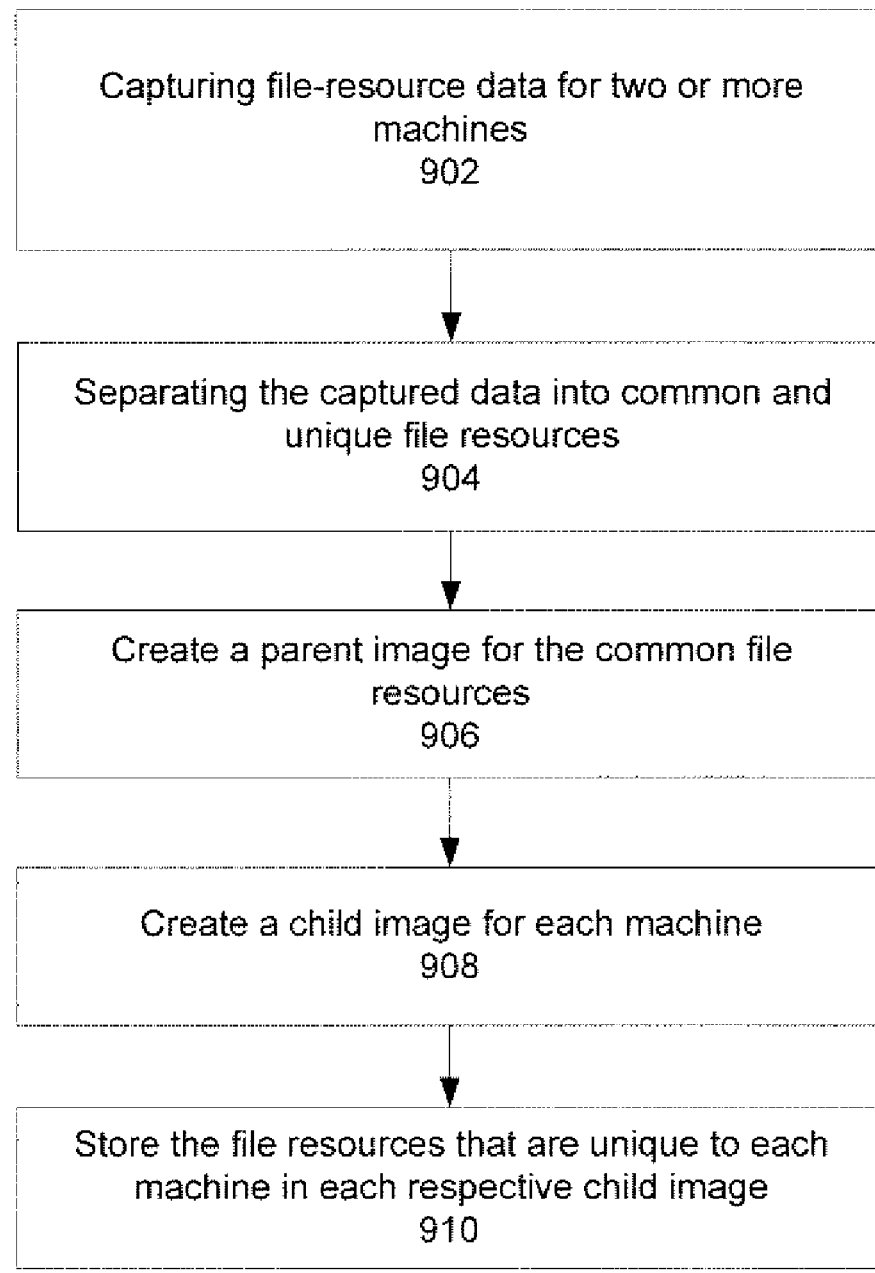
FIG. 9 is a flowchart illustrating the process for creating a parent/child image relationship in the capture of a system of two or more machines in accordance with exemplary embodiments.

FIG. 9 is a flowchart illustrating the process for creating a parent/child image relationship in the capture of a system of two or more machines.

In block 902, capture module 202 captures file resource data for a system of machines. In an exemplary embodiment, the capture module 202 works in conjunction with the consolidation module 208 to ensure single-instancing and elimination of file redundancy in captured file resources. Methods and processes for capturing a computer system in a monolithic form in a manner that promotes the single-instancing of files are described in the Cohen patent and Windows Format disclosure, both of which are incorporated by reference in their entirety.

In block 904, processes are performed on the captured file resources to determine which file resources are common to the entire system of machines and which file resources are specific to an individual machine.

In blocks 906-910, the parent creation 206 module may create a parent image for storage of common file resources and the child creation module 210 may create a child image for each individual machine in the system of machines. The child creation module 210 may store resource files specific to an individual machine in the created child image which may be associated with that specific machine.

It should be appreciated that the steps and order of steps illustrated in the flowchart is purely exemplary and non-limiting. In a particular embodiment, the parent image, child image, and metadata-only file may be created in single process. The metadata only file may be created prior to the creation of either the parent or the child resource-only files. The metadata-only file may be created with reference to the WIM header and metadata blocks in a captured monolithic WIM file.

Figure 10:
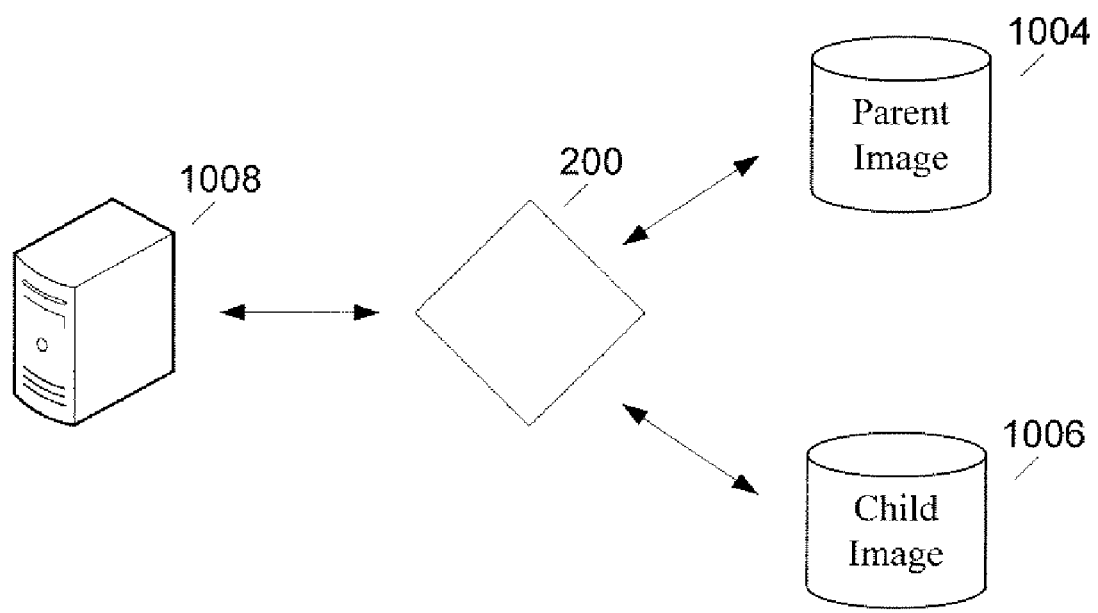
FIG. 10 illustrates an architecture for the creation of parent and child images in accordance with exemplary embodiments.

FIG. 10 illustrates an architecture for the creation of parent and child images in accordance with exemplary embodiments. In a particular embodiment, the image modularization module 200 may be implemented at a system 1008, or may be implemented at a server or other device that is communicatively coupled to the system 1008 via the data network 104. The system 1008 may be a computer, a server, or other device capable of storing data. The system 1008 could be a software application. The system 1008 could include, for example, an operating system, applications, and settings. The image modularization module 200 may access the system 1008 to create a parent image 1004 and a child image 1006.

The parent image 1004 may include common resource files, and the child image may include unique resource files and metadata. In an exemplary embodiment, the parent image 1004 may include data that is common to a plurality of virtual machines. For example, assume that the IT department of a large company would like to create virtual machines for every computer in a given department that include fifty machines. The parent image may be created to include files common to such a system 1008 that includes fifty machines. For instance, the machines may have the same operating system and the same office applications. The image modularization module 200 may include these common resources in the parent image 1004. The image modularization module 200 may include unique resources exclusive to a single computer in a child image 1006 specific to that computer. For example, some of the computers could have different hardware than others, which may result in different hardware drivers. A unique hardware driver that exists on a given machine, for example, may be included in the child image 1006, which is specific to that machine. Thus, instead of creating 50 different virtual machines for the 50 computers, the image modularization module 200 creates a parent image with the data common to all 50 computers, and then creates a child image 1006 that is comparatively smaller than the parent image 1004 and has data specific to each computer.

Figure 11:
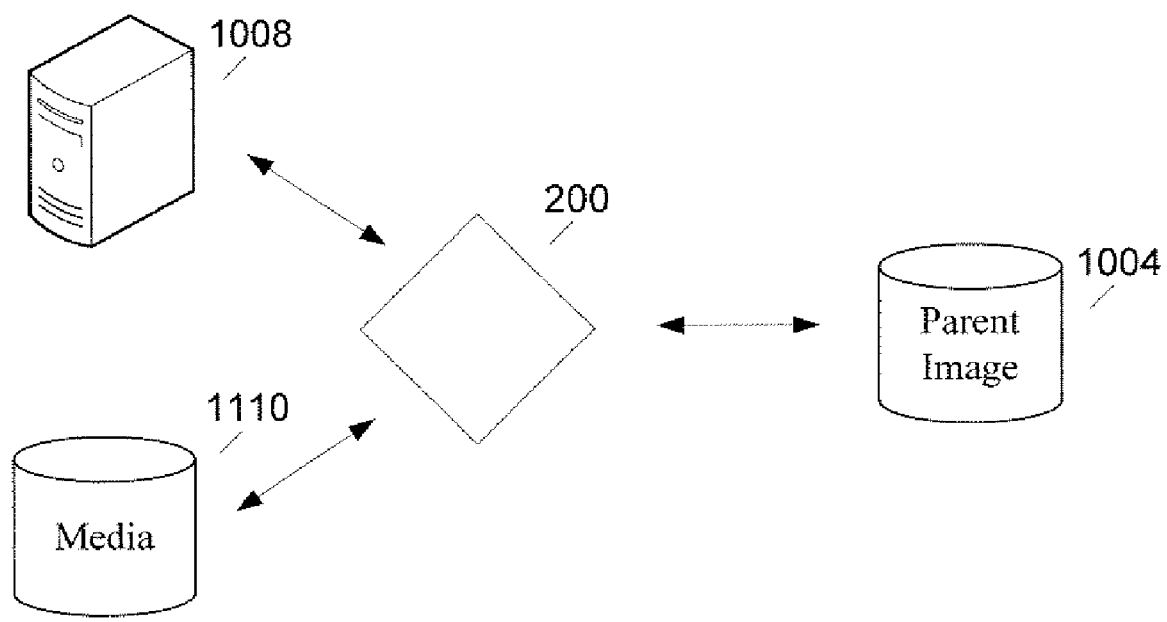
FIG. 11 illustrates creating a parent image from media and/or one or more systems in accordance with exemplary embodiments.

FIG. 11 illustrates creating a parent image 1004 from media and/or one or more systems 1008 in accordance with exemplary embodiments. As discussed with respect to FIG. 10, the parent image 1004 may include file resources common to a system 1008. In a particular embodiment the parent image 1004 may include a software application or a collection of software applications. An example of a collection of software applications is an operating system plus office software. For instance, a company may want to update all their computers company-wide with a new operating system such as Windows Vista™ plus Office 2007.

In a particular embodiment, the parent image may be a combination of system resources and software programs. For example, the parent image 1004 may include the file resources common to a system of machines 1208 and may also include software programs that run on the system 1008. Once the parent image is captured, the parent image 1004 may be considered read-only. Making the parent image 1004 read-only after a capture is complete allows for that parent image 1004 to be leveraged to be leveraged against an updated system 1208 to create child one or more child images 1006.

In the virtual machine context, creating the parent image 1004 includes capturing the volumes for each virtual hard disk, and then determining what volume is the best cut-off to being the parent.

Figure 12:
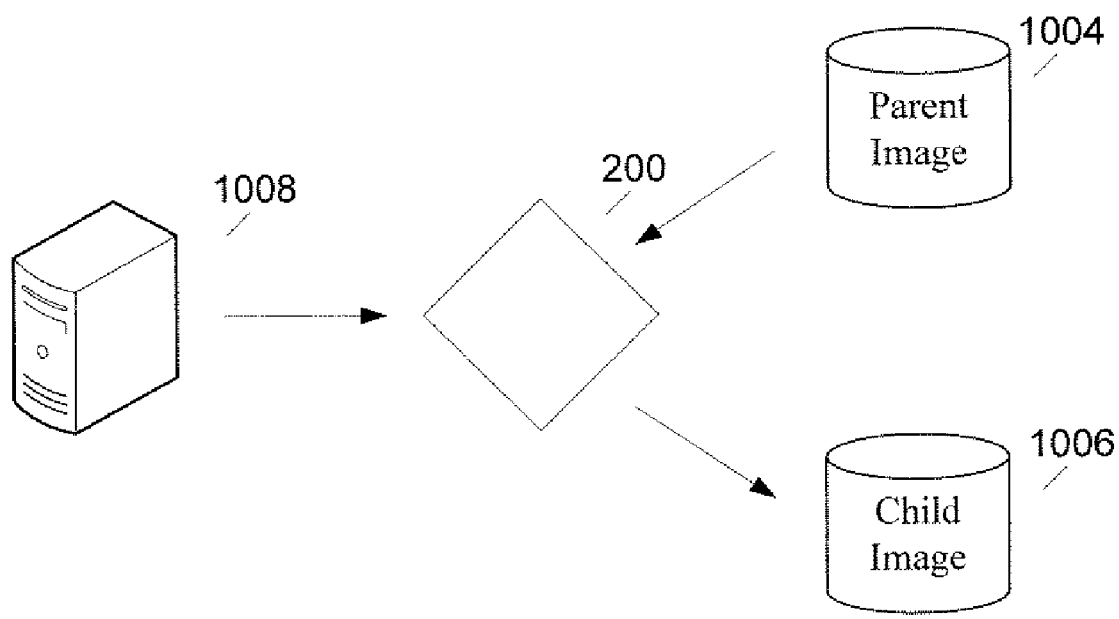
FIG. 12 illustrates creating a child image in accordance with exemplary embodiments.

FIG. 12 illustrates creating a child image 1006 in accordance with exemplary embodiments. In a particular embodiment, a child image 1006 is created by capturing a system against a read-only parent image 1004.

The child image 1006 may refer to the parent image 1004. An additional child image may be added. The additional child image may refer to the first child image and thus indirectly refer to the parent image. The additional child image may be created by capturing a newly-updated system against the combined image of the parent and the first child image. In this manner, the additional child image may be daisy-chained onto the first child image and contain only the differences between the previous update and the subsequent update.

Figure 13:
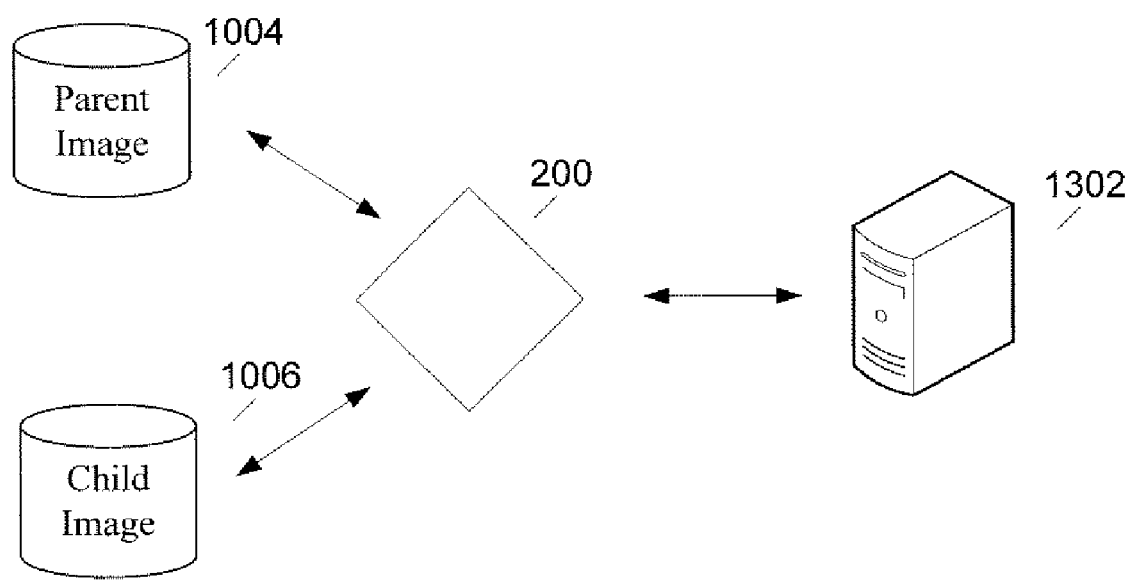
FIG. 13 illustrates recreating the system by referencing parent and child images and applying them to a target system in accordance with exemplary embodiments.

FIG. 13 illustrates recreating or deploying the system by referencing parent and child images and applying them to a target system 106. In a particular embodiment, the system recreation module 214 takes as input a parent image 1004 and one or more child images 1006. The system recreation module 214 follows the instructions provided by the one or more metadata-only files of the one or more child images and combines the file resource data of the parent image and the file resource data included in one or more child images to recreate the image at the target system 106.

The system recreation module 214 may be compatible with methods of deploying conventional WIM's, such as those described in the Cohen patent and the Windows Format document, both of which are incorporated by reference in their entirety. The system recreation module 214 may specify the resource-only portions of an image to be deployed. As a non-limiting example, in an image stored with a parent/child relationship, a parent file may be named parent.rwm, a child resource-only file may be named child.rwm, and a metadata-only file may be named child.wim. The system recreation module may identify or set the rwm files of the image as reference files. The system may also specify the child.wim file of the image, and recreate or apply the image using the child.wim file in conjunction with the previously set reference files.

In the event that the parent or child rwm files have been spanned, the spanned files can also be set as reference files, and then the image can be applied with reference to the metadata-only file which refers to the rwm files which have been set as reference files.

The following is some purely exemplary and non-limiting pseudocode for creating the parent and child images from a monolithic WIM file. It should be appreciated that the following pseudocode is merely an exemplary means for implementing various exemplary processes described above, and should not be construed as the process itself.

The conversion may take the following variables:

group_file_name—A file name for the delta (such as "delta.wim") which may be used to name all files in the group.

wim_file_name—The full path to the WIM which contains the images.

image_start—The number of the first image to include.

image_end—The number of the last image to include.

max_split_size—A maximum size for a resource wim. Once a resource wim reaches this size, a new resource wim may be created and filled.

We may, for example, have a monolithic WIM called "vista.wim." This image may contain seven images. For this example, assume that we want to store images two and three as an ancillary file resource in one or child images:

wim_delta_split("images_2_and_3.wim", "vista.wim", 2, 3)

In this example, the following terminology is used to describe each file being read or written:

The "WIM file" is the file from which metadata and resource are read. It contains the images which should be split into children.

The "group WIM" is the file we are writing metadata into. A delta split group comprises one group WIM. It is named according to the group_file_name variable. This file may be rather small. In some instances, from a few megabytes to a few hundred megabytes.

The "group resource WIM" is a file containing resource files, all the compressed assets for this group. A group may have several resource WIMs, each may be named with the .rwm extension. The group_file_name variable is used as a guideline for naming. If the group_file_name is "vista.wim", then resource WIMs will be named "vista.rwm", "vista2.rwm", "vista3.rwm" and so on. These files can grow quite big, even into gigabytes of data, and may be constrained by the max_split_size variable.

The process of converting a monolithic WIM file into a parent/child relationship may proceed as follows. Again, it should be emphasized that the following steps are purely exemplary and non-limiting.

1. The WIM file (at path wim_file_name) is opened and its header is read.

2. The group file is created and the WIM header is copied verbatim.

3. Loop through the WIM file's lookup table, stopping at each metadata record:

A. If the image number for that metadata record is less than image_end, copy the metadata block to the group file. (So, if image_end is 3, then metadata for images 1 through 3 are copied to the group file, in order.)

4. Repeat the above loop again, this time copying the lookup entries for each metadata record, with the following changes:
  A. Alter the item.part_number for each lookup entry to 1.
  B. Change the item.offset to the positions we copied to in step #3.
5. Read the WIM file footer.
6. Find the closing </IMAGE> tag for the image at position image_end.
7. Close the XML block with a </WIM> after that tage, thereby truncating the number of images listed in the XML block.
8. Write the new footer to the group file.
9. Alter the WIM header:
  A. Remove integrity table lengths, offsets, and sizes.
  B. Add the WIM_META_ONLY flag to header.flags.
  C. Change header.total_wims to 1 and header.part_number to 1.
  D. Set header.total_images to image_end.
  E. Set header.footer_offset to location where the footer was written in step #8.
  F. Set header.footer_size and header.footer_length to the length of the new footer.
  G. Set header.image_offset to the location where the lookup table was written in step #4.
  H. Set header.image_length and header.image_size to the length of the new lookup table.
10. Write the new WIM header to the beginning of the group file.
11. Loop through the WIM file's lookup table again, this time copying non-metadata entries (resources):
  A. If the image number for that resource record is greater than image_start and less than image_end, continue.
  B. If no group resource WIM is active or if the group resource WIM has reached the split cap, create a new group resource file. (Naming convention is: group.rwm, group2.rwm, group3.rwm, etc.)
  C. Copy the resource file from the WIM file to the group resource WIM.
12. Loop through the WIM file's lookup table, this time copying the lookup entries for each resource file, making the following alterations:
  A. Alter the item.part_number for each lookup entry to 1.
  B. Change the item.offset to the positions we copied to in step #11.
13. Loop through each created group resource WIM, writing the original WIM header, altered as follows:
  A. For header.flags, remove the WIM_META_ONLY flag and add the WIM_RESOURCE_ONLY flag.
  B. Add the WIM_SPANNED flag to header.flags.
  C. If image_start>1, add the WIM_Delta flag.
  D. Set header.total_images to 0.
  E. Set header.part_number to the order of this resource WIM in the group (starting with 1.)
  F. Set header.footer_offset to the end of the lookup table written in step #12.
  G. Set header.footer_length and header.footer_size to 80 (a blank footer.)
  H. Set header.image_offset to the position where writing began on step #12.
  I. Set header.image_length and image_size to the length of the new lookup table for this file.
14. Write blank footers to the end of each group resource WIM.
15. Close all open file handles.

It should be appreciated that the above pseudocode is an exemplary means for carrying out various processes described throughout the specification. It should be regarded in an illustrative and nonrestrictive sense.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for facilitating portable distribution of a virtualized computer system and software by storing and distributing virtualized computer images in a parent-child relationship, comprising:
  capturing a computer system in a file-based manner such that duplicate files are not stored in the virtualized computer system and software;
  segregating the captured computer system into primary file resources and ancillary file resources based on at least predetermined parameters, wherein segregating based on predetermined parameters comprises identifying at least one of operating system file resources and database management system file resources as primary file resources and identifying other software file resources as ancillary file resources, wherein the predetermined parameters for segregation are from a graphical user interface (GUI) module, an image modularization module, or a combination thereof;
  creating a parent image and at least one child image, wherein the child image refers to the parent image and wherein the parent image and child image are configured to represent multiple images or machines;
  storing the primary file resources onto a parent image; and
  storing the ancillary file resources into the at least one child image which refers to the parent image.

2. The method of claim 1 wherein the parent image is read-only.

3. The method of claim 1 wherein the parent image is an operating system.

4. The method of claim 1 wherein the parent image is a database management system.

5. The method of claim 1 wherein the virtualized computer system comprises one or more virtual machines.

6. The method of claim 1 wherein the at least one child image comprises a resource-only file and a metadata-only file.

7. The method of claim 6 wherein the resource-only file of the at least one child image initially contains no bytes.

8. The method of claim 7 wherein subsequent updates to the parent image are stored in the at least one child image.

9. The method of claim 6 wherein the metadata-only file comprises instructions on recreating the image.

10. The method of claim 1 wherein the parent and the at least one child image are distributed to the end user for deployment.

11. The method of claim 10 wherein the parent image is distributed on a disk.

12. The method of claim 10 wherein the parent image is hosted on a server.

13. The method of claim 10 wherein the at least one child image is made available for download.

14. The method of claim 1 wherein the virtualized computer system is a combined image representing two or more images.

15. A non-transitory computer readable medium comprising code which when executed on a computer processor performs the method of claim 1.

16. The method of claim 1 wherein segregating the captured system into primary file resources and ancillary file resources is further based on different criteria, wherein segregating based on different criteria comprises identifying file resources that are common to multiple machines as primary file resources and identifying unique file resources as ancillary file resources.

17. The method of claim 1 wherein segregating the captured system into primary file resources and ancillary file resources is further based on initial capture, wherein segregating based on initial capture comprises identifying all single-instanced file resources of an initial capture of a computer system as primary file resources and identifying at least one of resource-only file resources and update resource files as ancillary file resources.

18. The method of claim 1 wherein creating the parent image and the at least one child image further comprising daisy-chaining one or more additional child images.

19. A system comprising:
at least one data storage unit; and
at least one computer processor communicatively coupled to the at least one data storage unit, the at least one computer process comprising:
  a capture module component configured to capture a computer system in a file-based manner such that duplicate files are not captured in the virtualized computer system and software;
  a file size allocation module component configured to segregate the captured system into primary file resources and ancillary file resources based on at least predetermined parameters, wherein segregating based on predetermined parameters comprises identifying at least one of operating system file resources and database management system file resources as primary file resources and identifying other software file resources as ancillary file resources, wherein the predetermined parameters for segregation are from a graphical user interface (GUI) module, an image modularization module, or a combination thereof; and
  a parent creation module component configured to create a parent image and a child creation module configured to create at least one child image, wherein the parent image and the at least one child image are configured to represent multiple images or machines and wherein a metadata-only file is included as part of the child image;
  wherein the parent creation module component is configured to write primary file resources onto a parent image;
  wherein the child creation module component is configured to write ancillary file resources into one or more child images which refer to the parent image and to create a metadata-only file; and
  wherein the metadata-only file comprises instructions on how to recreate the captured system.

20. A system for facilitating portable distribution of virtualized computer systems and software by storing and distributing virtualized computer images in a parent/child relationship, comprising:
a data storage unit;
a computer communicatively coupled to the at least one data storage unit, the computer comprising an image modularization module configured to:
capture two or more machines in a file-based manner that eliminates the existence of duplicate files and produces file resource data that represents a combination of the two or more machines in the virtualized computer systems and software;
process the file resource data to segregate the file resource data into file resource data that is common to the two or more machines and file resource data that is not common to the two or more machines;
create a parent image for storing the common file resource data;
create two or more child images, wherein the child images comprise file resources wherein each of the two or more child images corresponds to one of the two or more machines;
for each of the two or more machines, store the file resources of that machine that are not common to two or more machines in the at least one child image that corresponds to the machine;
wherein the child image refers to the parent image;
wherein each machine is configured to be deployed upon reference to the parent image and child image.

21. A method for facilitating portable distribution of virtualized computer systems and software by storing and distributing computer images in a parent-child relationship, comprising:
capturing two or more machines in a file-based manner that eliminates the existence of duplicate files and produces file resource data that represents a combination of the two or more machines in the virtualized computer systems and software;
processing the file resource data to segregate the file resource data into file resource data that is common to the two or more machines and file resource data that is not common to the two or more machines;
creating a parent image for storing the common file resource data;
creating two or more child images, wherein the child images comprise file resources wherein each of the two or more child images corresponds to one of the two or more machines;
for each of the two or more machines, storing the file resources of that machine that are not common to two or more machines in the at least one child image that corresponds to the machine;
wherein the child image refers to the parent image;
wherein each machine is configured to be deployed upon reference to the parent image and child image.

22. The method of claim 21 wherein the machine is a virtual machine.

23. The method of claim 22 wherein the machine is a physical machine.

24. The method of claim 21 wherein the machine is a collection of software.

25. The method of claim 21 further comprising:
receiving subsequent updates to the two or more machines;
creating additional child images for each of the two or more machines only to the extent that the combined image of the machine is modified by the update.

26. The method of claim 21, wherein the parent image is split along a predetermined boundary into a plurality of parent files.

27. The method of claim 21, further comprising receiving supplemental information which is configured to provide one or more updates to the one or more machines.

28. The method of claim 27, wherein the additional data that is unique to the data already represented by the parent image and child image is stored in an additional child file which refers to the at least one existing child file.

* * * * *